United States Patent [19]

Ratzlaff et al.

[11] Patent Number: 5,097,760
[45] Date of Patent: Mar. 24, 1992

[54] POWERED TRASH REMOVAL APPARATUS FOR ROUND BALER

[75] Inventors: Howard J. Ratzlaff, Hesston; Ferol S. Fell, Newton, both of Kans.

[73] Assignee: Hay & Forage Industries, Hesston, Kans.

[21] Appl. No.: 626,973

[22] Filed: Dec. 13, 1990

[51] Int. Cl.⁵ .................. B30B 5/06; A01D 39/00
[52] U.S. Cl. ........................ 100/88; 56/341; 198/813; 198/837
[58] Field of Search ............... 100/5, 76, 88; 56/341; 198/813, 837

[56] References Cited

U.S. PATENT DOCUMENTS

| | | | |
|---|---|---|---|
| 3,964,246 | 6/1976 | Kopaska | 100/88 X |
| 3,992,987 | 11/1976 | Sereg | 100/88 |
| 4,077,315 | 5/1978 | Meiers | 100/88 |
| 4,182,101 | 1/1980 | Gaeddert et al. | 56/341 |
| 4,336,750 | 6/1982 | White et al. | 100/88 |
| 4,399,748 | 8/1983 | Viaud | 100/88 |
| 4,428,282 | 1/1984 | Anstey | 100/88 |
| 4,890,449 | 1/1990 | Hering | 56/341 |
| 4,993,217 | 2/1991 | Pfrimmer et al. | 100/88 X |

OTHER PUBLICATIONS

Hesston Parts Catalog, p. 64, 550 Round Baler, Form No. 700 708 085, Revision B, Sept. 1988.

Primary Examiner—Harvey C. Hornsby
Assistant Examiner—Stephen F. Gerrity
Attorney, Agent, or Firm—Hovey, Williams, Timmons & Collins

[57] ABSTRACT

The mechanism for expelling residue from regions of entrapment within the baler includes a series of flat, peripherally corrugated, powered rotary elements projecting edgewise into the spaces between adjacent belts that bound the region in which the residue collects. The elements are mounted on a transverse shaft outside of the residue collecting region and across the outer face of the belts and are driven in such a manner that the residue engaging portions thereof move in a direction generally opposite to that of the proximal belts. Cylindrical hubs projecting laterally from opposite sides of each element underlie the adjacent belts to control slack in such a manner that any such slack is caused to accumulate on the upstream side of the axis of rotation of the elements rather than in the immediate vicinity of the elements, thus preventing injurious climbing of the belts onto the expeller elements.

33 Claims, 3 Drawing Sheets

POWERED TRASH REMOVAL APPARATUS FOR ROUND BALER

TECHNICAL FIELD

This invention relates generally to round balers and, more particularly, to improvements in removing trash and residue from those areas within a baler that tend to collect such materials during the baling operation.

BACKGROUND

Round balers are typically provided with moving belts that compactively envelop the bale as it is being formed and drive the bale in a spinning motion as a result of the moving surfaces of the belts. Crop materials tend to slough off the bale as it rotates and to accumulate as residue or trash in various pockets or regions of entrapment defined by the belts as they are looped around guide rolls and drive rolls which span the baling chamber of the machine.

One area of particular problem in a variable chamber baler (in which the chamber progressively increases in size during bale formation) is located adjacent the front end of the machine where a front stretch of the belts leading from the baling chamber is looped under a drive roll located adjacent the front of the entrance to the baling chamber. From that location the belts are then directed either forwardly and thence upwardly to other guide rolls or essentially immediately upwardly to higher rolls so as to form a generally V-shaped region of entrapment above the lower drive roll. This trapping region changes shape as the bale grows within the baling chamber and actually becomes progressively more confined as the latter stages of the bale growth are reached, due to the fact that as the bale enlarges, the span of belts engaging the front side of the bale is deflected forwardly from its initial position located more rearward in the machine. This has a tendency to pack and compress the trapped residue within the region and make it even more difficult to expel.

Because the collected residue can lead to malfunction of the baler in certain severe conditions, prior devices and belt arrangements have been utilized in an effort to solve the problem. One such arrangement is disclosed in Viaud U.S. Pat. No. 4,399,746 titled "Staggered Rolls and Belts for Round Baler" in which the belts adjacent the front of the machine are entrained around guide rolls in such a manner that escape openings are presented adjacent the bottom of the entrapping region to allow the materials to expel themselves from the machine.

Another approach is to utilize rotating, pronged discs or plates which typically project into the spaces between adjacent belts of the baler to physically engage the accumulated residue and to forcibly expel it through the spaces between the belts. One such arrangement is disclosed in Herring U.S. Pat. No. 4,890,449 titled "Attachment for Round Hay Baler". See also, U.S. Pat. No. 4,336,750 issued to White, et al., and titled "Stray Crop Buildup Expeller for Rotary Balers".

While rotary cleanout discs generally perform adequately for their intended purpose, in some cases they may damage the belts. This condition may arise where one or more of the belts goes slack during the baling operation and climbs onto the rotating disc. The points or projections on the disc may then tear into the belt, or at least stress it to such an extent that the belt must be prematurely replaced.

SUMMARY OF THE INVENTION

Accordingly, one important object of the present invention is to provide an improved arrangement for removing trapped residue from a round baler.

More specifically, an important object of the present invention is to provide a construction which utilizes the rotary cleanout element approach, but which improves upon such approach in a manner to prevent belt damage.

In carrying out the foregoing objects, the present invention contemplates having a series of peripherally corrugated cleanout discs or elements mounted on a common drive shaft that extends across the front of the baler in such a position that portions of the elements can project through the spaces between adjacent belts and into a region behind such belts where residue tends to collect. The elements are driven by means other than the belts themselves and are caused to rotate in such a direction that the element portions projecting through the belts rotate in a direction that is generally opposite to the direction of travel of the belts adjacent the elements. Each of the elements has a pair of cylindrical hubs which project outwardly from opposite sides of the element into close proximity or light touching engagement with the belts so that such hubs are also rotating in a direction opposite to the belts at their point of closest proximity to the belts. Thus, in the event one or more of the belts goes slack during the baling operation, the slack stretch is engaged by the proximal hub and guided to accumulate on the upstream side of the axis of rotation of the hub and its element, away from the periphery of the element. Thus, the slack does not tend to envelop the element but is, instead, encouraged to stay off the element, thereby avoiding damage to the belt. The elements and their hubs are secured to the drive shaft in such a way that the devices are free to migrate slightly back and forth along the length of the shaft on opposite sides of each belt as may be necessary to accommodate slight occasional changes in the tracking patterns of the belts as they loop under and are driven by the lower drive roll which is located adjacent the cleanout devices.

DETAILED DESCRIPTION

Figure 1:
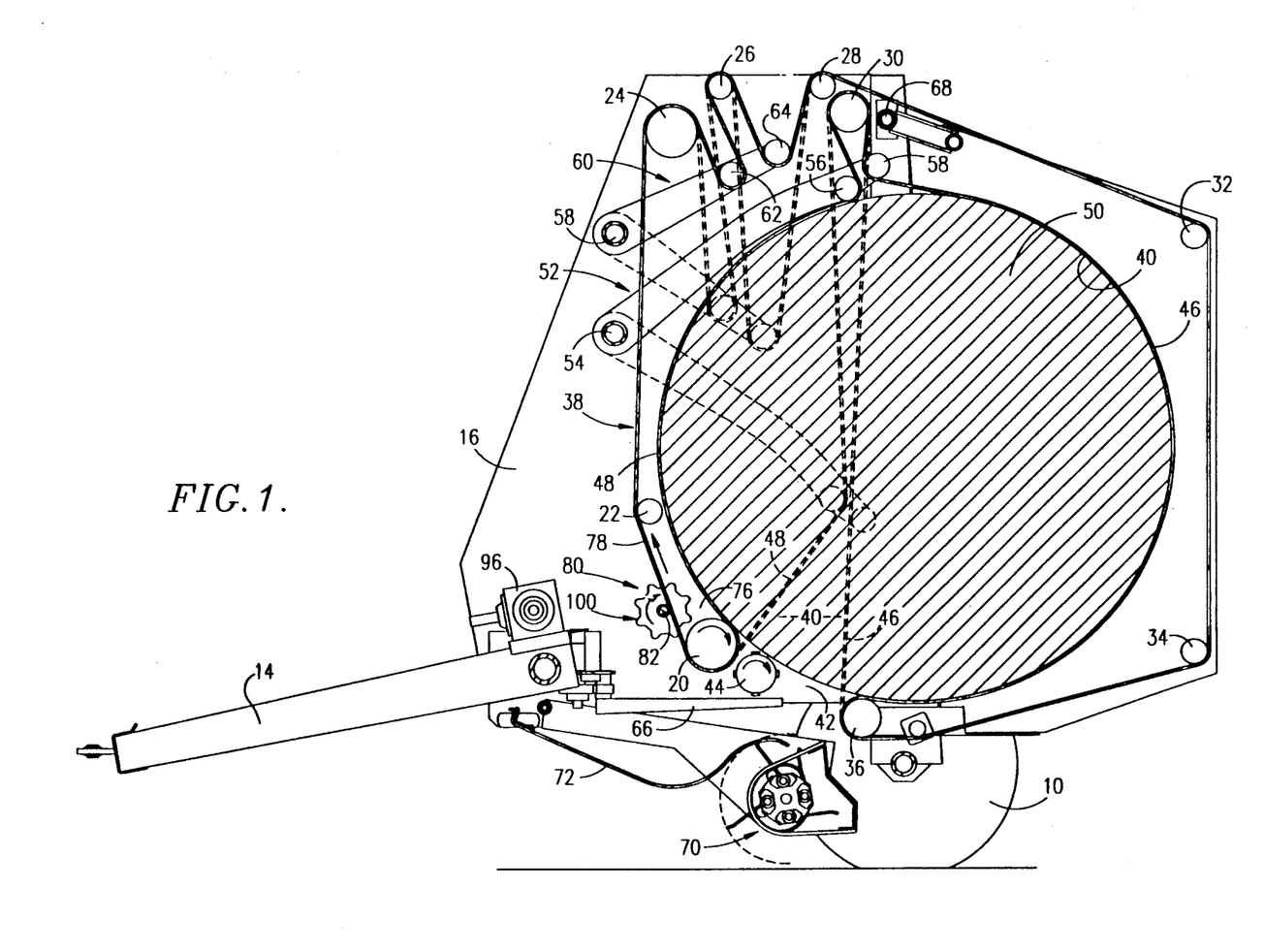
FIG. 1 is a somewhat schematic side elevational view of a baler incorporating the principles of the present invention with the near sidewall of the baler removed to reveal details of construction, the baler being illustrated with a full size bale contained within the forming chamber and the initial starting positions of the forming belts of the machine being illustrated in dashed lines.

The baler illustrated in FIG. 1 has a pair of ground wheels 10 and 12 (see, also, FIG. 2) which adapt the baler for movement across a field having cut crop materials lying thereon. A fore-and-aft extending tongue 14 at the front of the baler adapts the machine for connection to a towing vehicle (not shown).

A pair of opposite sidewalls 16 and 18 carry a plurality of parallel, transverse rolls 20,22,24,26,28,30,32,34, and 36 that span the sidewalls 16,18 and serve as supporting guides for a number of side-by-side, endless belts that are trained around the rolls 20-36 in a manner to provide a variable volume baling chamber between the sidewall 16,18. The belts are identified broadly by the numeral 38 and, in the particular embodiment illustrated, comprise eight in number. The baling chamber formed by the belts is denoted by the numeral 40 and changes shape throughout the bale forming process from a generally triangular shape in side elevation to a circular shape in side elevation, as may be seen in FIG. 1. An entrance 42 to the chamber 40 is defined near the lower front portion thereof between a lower belt roll 36 and a slightly upwardly and forwardly located, ribbed roller 44 that is journaled by the sidewalls 16,18 and assists in driving the bale during its rotation and forming action within the chamber 40. The chamber 40 is initially defined at the rear by an initially upright, upwardly moving stretch 46 of the belts and at the front by an initially downwardly and forwardly inclined, downwardly moving stretch 48 of the belts. The rear stretch 46 balloons rearwardly while the front stretch 48 balloons forwardly during bale growth, whereby to accommodate the full size bale as depicted by the bale 50 in FIG. 1.

The shape of the chamber 40 is controlled by a vertically swingable arm assembly 52 having a transverse pivot at 54 and provided with a pair of slightly spaced apart, transverse, parallel rollers 56 and 58 at its outer end. The belts 38 are looped upwardly over the roller 30 and pass between the two guide rollers 56 and 58 such that, when the arm assembly 52 is in its lowered position, as shown in phantom lines in FIG. 1, the baling chamber 40 is generally upright and triangular in elevation, as earlier explained, while when the arm assembly 52 is fully raise, as illustrated in solid lines in FIG. 1, the belt stretches 46 and 48 are allowed to balloon out in fore-and-aft directions to provide a circular cross-sectional or elevational shape to the chamber 40. The guide rollers 56 and 58 also close off the top of the chamber 40 during bale formation to prevent the escape of materials upwardly through the top of chamber 40 during operation. Suitable spring means (not shown) are coupled with the arm assembly 52 to bias the same downwardly toward its starting position, assisted in this regard by the force of gravity.

A second vertical swingable arm assembly broadly denoted by the numeral 60 is located above arm assembly 52 for swinging movement about a pivot at 58. The arm assembly 60 also carries a pair of transverse, slightly spaced apart guide rollers 62 and 64 under which the belts 38 are looped in the manner illustrated in FIG. 1. The arm assembly 60, in connection also with another spring means not shown, comprises the slack takeup means for the belts 38 so as to provide a certain amount of tension in the belts 38 yet also permit additional lengths of belting to be paid out as required during formation of the bale. It will be noted in this respect that when the baling chamber 40 is initially empty, or at least in its smallest configuration, the arm assembly 60 is fully lowered to its phantom line position of FIG. 1. However, by the time the bale 50 has reached full size, the arm assembly 60 has swung upwardly to its solid line position in FIG. 1, having paid out significant additional lengths of the belts 38 to accommodate the increased circumference of the bale 50.

After the bale has reached full size, it continues to be rotated within the chamber 40 by the moving belt stretches 46 and 48. At this time, twine may be dispensed to the bale via a dispensing tube 66 shown in its fore-and-aft extending, dispensing position but normally pivoted into a generally transversely extending direction during periods of non-use. Once the bale 50 is wrapped, the rear section of the baler consisting of the rolls 32,34, and 36, as well as proximal portions of the two sidewalls 16,18, may be swung rearwardly and upwardly about a pivot located at 68 so as to effectively open the chamber 40 and allow the formed and wrapped bale to fall to the ground. Reclosing of the rear half of the baler reestablishes the baling chamber 40 in its initially reduced size and shape.

A conventional windrow pickup 70 is supported below the chamber entrance 42 forwardly adjacent the roll 36 in position for engaging ground-supported crop materials as the baler is advanced and for lifting such materials upwardly and rearwardly through the entrance 42 into the chamber 40. A wind guard 72 of conventional construction extends rearwardly from the front of the baler into overlying relationship with the pickup 70 to assist in controlling the crop materials as they are acted upon by the pickup 70 and conveyed to the chamber entrance 42.

It will be appreciated that the baler hereinabove described comprises what may be referred to as a "vertical chamber, open throat" baler in view of the fact that the chamber 40 is initially vertically oriented and the throat area leading to the entrance 42 above the pickup 70 is completely opened and unobstructed, without the presence of compression rollers or the like. However, as will be recognized, the principles of the present invention, insofar as they relate to the removal of crop residue from collection points within the baler, are not limited to an open throat baler, or to one having a vertical starting chamber.

The area immediately above the lower front roll 20 (which is a drive roll for the belts) presents a region broadly denoted by the numeral 76 within which residue tends to collect. Such region 76 is bounded at the rear by the belt stretch 48 and at the front by the upwardly moving belt stretch 78 leading from the lower drive roll 20 to the idler 22. The inside surface of the belt stretch 78 faces the region 76. Initially, the region 76 is generally cross-sectionally V-shaped, but becomes compressed and condensed as the bale 50 enlarges to ultimately assume more of a transversely rectangular shape of significantly reduced dimensions by the time the bale is full-size.

Mechanism for removing residue from the region 76 is broadly denoted by the numeral 80 and includes a transverse drive shaft 82 spanning the distance between the two sidewalls 16,18 along the outside of the belt stretch 78 in front of the latter. At its opposite ends, as shown in FIG. 3, the shaft 82 projects through and slightly beyond the two sidewalls 16,18 where it is journaled by a pair of bearings 84 and 86 carried by support structure on the respective sidewalls 16,18. A sprocket 88 fixed to the left end of the shaft 82 outboard of the left sidewall 18 is entrained by a drive chain 90 (FIG. 2) for rotation in a clockwise direction viewing FIG. 2. The chain 90 receives its driving input from a forwardly disposed sprocket 92 fixed to a shaft 94 leading to a right angle gear box 96 (FIG. 1). The gear box 96, in turn, is coupled with a drive line (not shown) which extends along the tongue 14 and is ultimately connected at its front end with the power takeoff shaft of the towing vehicle (not shown).

Figure 2:
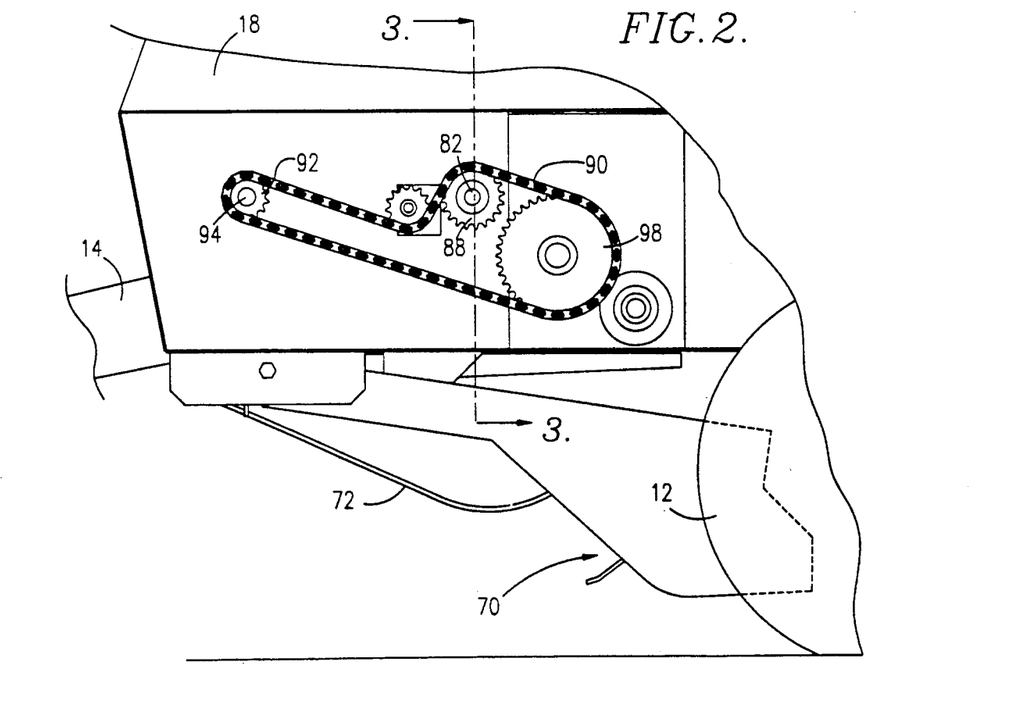
FIG. 2 is an enlarged, fragmentary left side elevational view of the baler illustrating portions of the drive mechanism for the lower drive roll of the machine and the cleanout mechanism of the present invention.
Figure 3:
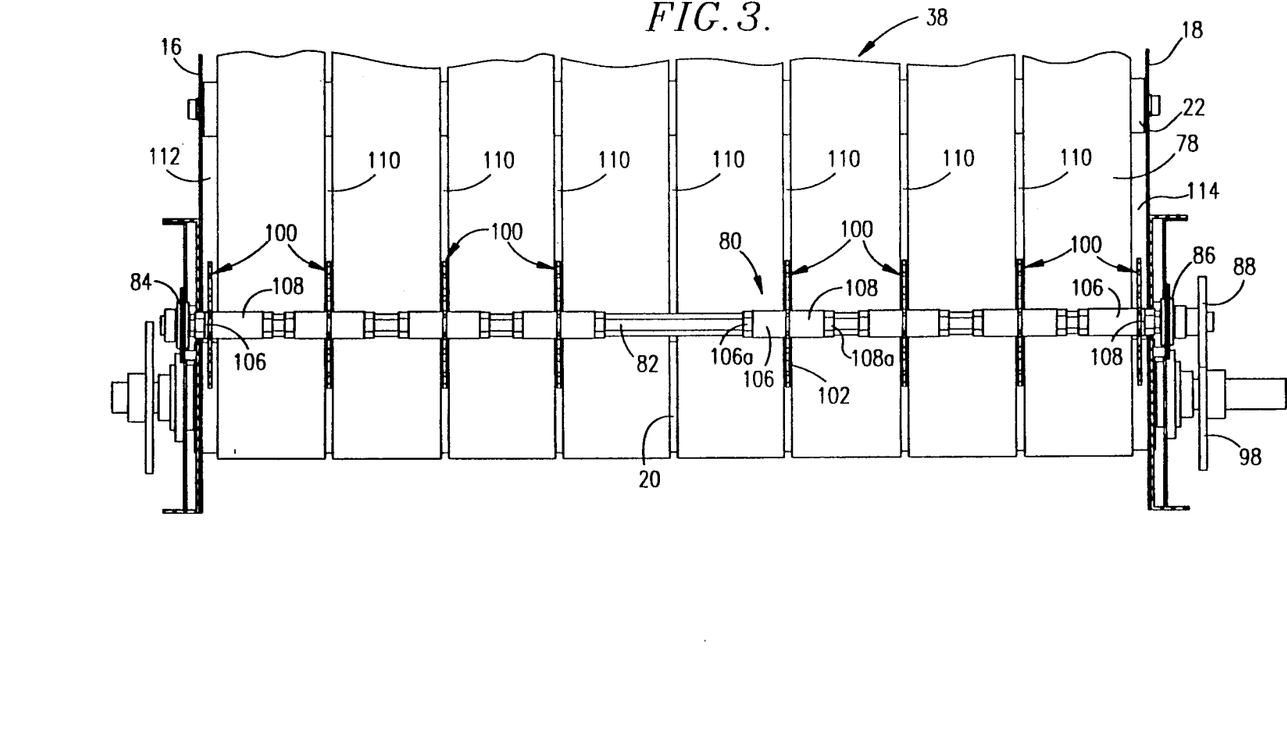
FIG. 3 is an enlarged, fragmentary, cross-sectional view through the front of the baler taken substantially along line 3—3 of FIG. 2 and illustrating the relationship between the residue expelling mechanism of the present invention and the belts of the baler.

It will be noted that the chain 90 is also trained around a large sprocket 98 disposed downwardly and to the right of the sprocket 88 in FIG. 2, the large sprocket 98 being fixed to the lower guide roll 20 for supplying driving power thereto.

The expelling mechanism 80 further includes a plurality of individual expeller units 100 located at spaced intervals along the shaft 82 and coupled with the latter for driving rotation thereby. In the illustrated embodiment, eight expeller units 100 are illustrated, although that number can vary depending upon the number of belts utilized in the baler and personal preference. In the preferred embodiment, as illustrated, all eight of the units 100 are identical to one another, except for the two opposite endmost units 100, which are slightly different from the rest of the units, as will hereinafter be described in more detail.

Figure 4:
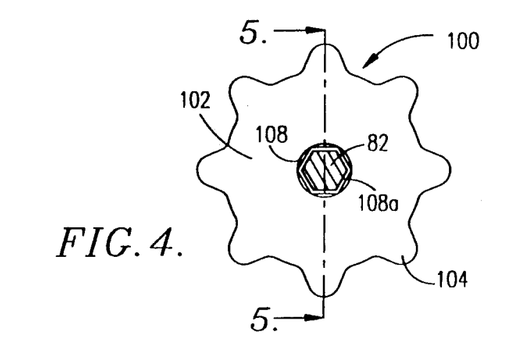
FIG. 4 is an enlarged transverse, cross-sectional view through the mechanism illustrating details of one of the cleanout elements and its associated structure.
Figure 5:
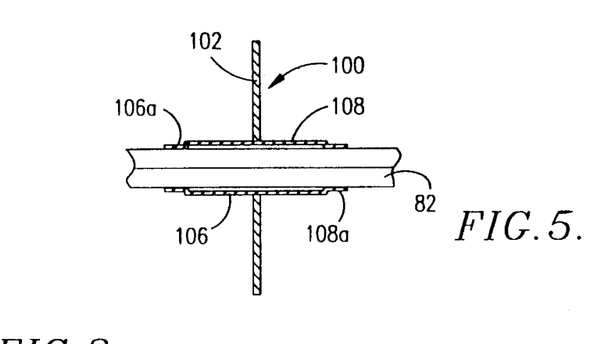
FIG. 5 is a fragmentary, cross-sectional view of the element and its adjacent structure of FIG. 4 and taken substantially along line 5—5 of FIG. 4.

With reference particularly to FIGS. 3, 4, and 5, it will be seen that each unit 100 includes a generally circular, plate-like element or disc 102 having an undulated or corrugated periphery presenting a series of equally spaced, radially outwardly extending, rounded projections 104. The element 102 is fixed to a pair of centrally disposed, coaxially aligned hubs 106 and 108 that project laterally outwardly from opposite sides of the element 102 and may be conveniently constructed as integral portions of a single cylindrical component. The hubs 106 and 108 encircle the drive shaft 82 and have their outermost ends 106a and 108a, respectively, formed into a hexagonal shape so as to matingly receive the drive shaft 82 which is also hexagonal in transverse cross-section. The hexagonally shaped ends 106a and 108a are not fixed to the surface to the shaft 82, thus permitting each unit 100 to be shifted lengthwise along the shaft 82 yet driven rotatively by the latter as the flats of the shaft 82 match and engage the flats of the hexagonal ends 106a and 108a.

The expeller unit 100 which is closest to the sidewall 18 differs from the majority of the units 100 in that the hub 108 of such unit is shorter than hub 106 thereof and projects through the sidewall 18 into a position adjacent the bearing 86. Likewise, but in a reverse manner, the expeller unit 100 adjacent the opposite sidewall 16 differs from the majority of the units 100 in that the hub 106 of such unit is shorter than the hub 108 and projects through the sidewall 16 into close proximity to the bearing 84. Otherwise, all of the units 100 are identical to one another.

The belts 38 are slightly spaced apart across the width of the baler to define a number of narrow spaces 110, as illustrated in FIG. 3. Furthermore, the two outboardmost belts 38 are spaced slightly from their respective sidewalls 16 and 18 so as to define spaces 112 and 114, respectively, between such outboardmost belts and the sidewalls 16 and 18. The drive shaft 82 associated with the cleanout mechanism 80 is so positioned relative to the belts 38 that the elements 102 project partially into the region 76 through the spaces and 114. All but the center space 110 between the two middle belts in the series has an expelling element 102 projecting therethrough. Consequently, the first three belts and the last three belts in the series of eight belts in the illustrated embodiment have expeller elements 102 disposed on opposite sides thereof so that the belts are confined between adjacent pairs of the elements 102.

Operation

Figure 6:
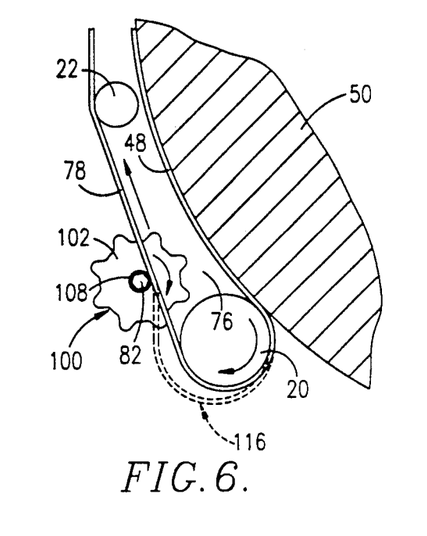
FIG. 6 is a fragmentary, schematic view of the lower front portion of the baling chamber illustrating the manner of operation of the cleanout mechanism of the present invention.

The baling operation in general has been described above and will not be repeated at this time. However, with respect to the residue expelling mechanism 80, it is to be noted that all of the units 100 rotate in a clockwise direction, viewing FIGS. 1 and 6, which is the same direction of rotation as the powered lower guide roll 20. Parenthetically, it should also be noted that the upper guide roll 24 in the illustrated embodiment is also a powered roll driven by means not illustrated. Of course, the upper roll 24 is also rotating in a clockwise direction, viewing FIG. 1.

With the elements 102 of the expeller units 100 constantly rotating into the residue collecting region 76, any material tending to collect in that area, particularly during the latter stages of bale formation, is engaged by the turning elements 102 and forcibly projected outwardly through the spaces 110,112, and 114 to purge that area of collected residue. The expelled crop residue thus falls down into the area immediately ahead of the pickup 70 where it is commingled with incoming materials and returned to the baling chamber 40.

It is to be appreciated that in some instances the action of the elements 102 may also be in the nature of cutters as well as expellers. In this respect, it has been found helpful in some crop conditions to have the elements 102 thin enough that the peripheries of the projections 104 present relatively sharp edges to crop strands trapped within the region 76 so that the projections 104 may sever the strands and thus reduce them to a length which more readily escapes between the belts. In high moisture conditions such as during the baling of silage, this type of cutting or slicing action on the part of the elements 102 has been found to be particularly helpful.

In the preferred embodiment, the hubs 106 and 108 of each expeller unit 100 not only underlie the outer surfaces of the proximal belts, but also lightly engage such surfaces. Thus, the hubs 106 and 108 and the belts 38 are moving in mutually opposite directions at their points of tangential contact with one another. This provides a certain doffing action or abrading effect by the belts 38 against the hubs 106 and 108 to maintain the latter in a clean condition without the wrapping of crop residue therearound.

Moreover, the presence of the hubs 106,108 on the outside of the belts 38 in the area of the stretch 78 is important in controlling slack which may from time to time occur in one or more of the belts during operation. In this respect, it will be recognized that either or both of the guide rollers 56 and 58 of arm assembly 52 rides on the top of the bale 50 during formation and growth of the bale. Such guide rollers 56 and 58 extend the full length of the bale between a pair of interior arms of the assembly 52 located adjacent the respective sidewalls 16 and 18 (only one of the arms being illustrated in FIG. 1). Consequently, if one portion of the bale happens to grow at a faster rate than another, the entire arm assembly 52 will be raised by the larger portion of the bale. While the belts in the vicinity of the large portion may remain taut, those belts in a smaller portion of the bale may develop some slack, such as the slack stretch 116 illustrated in phantom lines in FIG. 6. It will be noted, however, that the slack stretch 116 droops down on the upstream side of the shaft 82 generally away from the periphery of the expeller element 102 such that there is little danger of the slack stretch 116 becoming wrapped around the expeller element 102. This is particularly true in view of the fact that the shaft 102 is rotating in a direction opposite to the direction of travel of the slack stretch 116 at the point of contact of the stretch 116 with the hubs 106,108.

Figure 7:
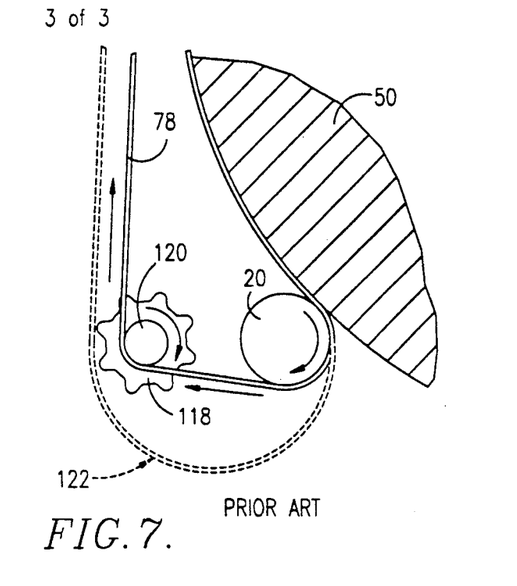
FIG. 7 is a schematic, fragmentary view of the lower front portion of a prior art arrangement illustrating the slack belt problem which could arise in such construction.

This action is to be contrasted to what could happen in the prior art arrangement as illustrated in FIG. 7, wherein an expeller disc 118 was mounted on a cross tube 120 located inside of the belt stretch 78 and driven by the belts themselves. In this arrangement with the cross tube 120 rotating in the same direction as the belt stretch 78, slack 122 in the belts could droop down into a large enough arc to be disposed outside the periphery of the discs 118. Consequently, any lateral movement of the slack stretches 122 could bring them into circumscribing relationship with the adjacent discs 118 causing the belts to climb up on the discs 118 and become damaged thereby.

It should also be apparent that the ability of the expeller units 100 to move independently of one another along the axis of the shaft 82 is helpful in reducing damage to the belts 38 and in maintaining them in their proper tracking relationship. In this respect, it will first be noted that each adjacent pair of the expeller units 100 tends to trap one of the belts 38 therebetween; thus, the stabilizing influence of the other belts in the series is transmitted from belt-to-belt and unit-to-unit because of the closely spaced relationship of the belts to the units 100. Should one of the belts 38 tend to move out of its track, it is resisted in such movement by the other belts and units 100 in the series across the machine, thus tending to keep the errant belt in its proper location.

On the other hand, if there is a circumstance when a belt does need to move laterally one way or the other to a limited extent, this can be accommodated without damage to the belt because the involved units 100 can simply be shifted axially along the shaft 82 by the lateral force imparted by the shifting belt.

In practice, it has been found desirable to have the expeller units 100 rotating at approximately twice the speed of the lower drive roll 20. However, in high moisture conditions, such as in the baling of silage, it has been found desirable to have the units 100 rotating even faster, on the order of at least twice as fast as their normal speed.

Although the expelling mechanism 80 has been illustrated and described with respect to a belt stretch 78 that is upwardly and forwardly inclined, at all. Thus, as an example, the idler roll 22 shown upwardly and forwardly from the drive roll 20 could be disposed more nearly in a horizontal relationship with respect to the drive roll 20, in which event the belt stretch 78 would be generally horizontal.

Moreover, it is within the concepts of the present invention to have the slack controlling means, i.e., the hubs 106 and 108, located out of concentric relationship with the axis of rotation of the expeller elements 102. Although not illustrated in the drawings, it is to be understood in this respect that a transverse shaft, rotating or otherwise, could be located upstream from the axis of rotation of the bank of elements 102, generally underlying the belt stretch 78, so that in the event slack should occur in any one of the belts 38 in the vicinity of the stretch 78, such slack would be formed at an upstream location with respect to the elements 102, thus inhibiting the tendency of the loose belts to climb onto the peripheries of the elements 102.

It is also within the concepts of the present invention to have the drive shaft 82 itself serve as the slack control means for the belt stretch 78, rather than additional hubs 106 and 108 on each of the elements 102. One construction is to have the various expeller units 100 fixed to the drive shaft 82 in a manner that precludes their longitudinal shifting along the latter but which secures the units to the shaft 82 for rotation purposes. In such circumstance, the shaft may be of circular cross section, presenting a smooth cylindrical outer surface to engage the adjacent surfaces of the slackening belt stretch 78 when appropriate. Although the hexagonally shaped shaft 82, as illustrated, can itself perform this function, the series of flat surfaces on the periphery of the shaft 82 makes the shaft somewhat aggressive and thus encourages the wrapping of stemmy materials on the shaft. Thus, in preferred form, the units 100 are free-floating along the hexagonal shaft 82 and the hubs 106 and 108 are utilized as the means for controlling the belt slack, as hereinabove described.

It will also be apparent that although the expelling mechanism 80 has been illustrated in connection with a region 76 which is located above the front drive roll 20, other such regions could occur in the baler needing trash and residue removal. For example, the area behind the roll 36 may be in need of residue removal. Thus, the concepts of the present invention are not limited to a trapping region which is located in front of the bale chamber above a lower drive roll for the belts of the machine.

Although the arm assemblies 52 and 60 have been described only briefly herein, it is believed that the construction and function of such assemblies will be readily understood to one ordinarily skilled in the art. It will be appreciated, also, that many different types of such assemblies could be utilized, particularly since the present invention is not limited to a particular style of round baler, or even a variable chamber round baler, for that matter. As but one example of an alternative control mechanism for the tension and slack in the forming belts of the baler, reference is hereby made to the earlier-mentioned patent to White et al. U.S. Pat. No. 4,336,750, such patent being incorporated herein as need be for a full and complete understanding of the principles of the present invention.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler having at least a pair of side-by-side belts movable in a certain linear direction during baling operations and an interior region inside of the belts tending to collect residue during baling operations, mechanism for removing residue from said region including:
   a rotary element disposed for rotation within a space between said belts for engaging residue within the region and expelling the residue through said space; and
   guide means outside of the belts in disposition for engaging slack stretches in the belts in the event such slack stretches form adjacent the element during baling operations and for causing such slack stretches to accumulate on the upstream side of the axis of rotation of the element with respect to said certain direction of belt travel during said movement of the belts,
   said guide means being rotatable with said element about said axis of rotation,
   said element and said guide means being rotatable in such a manner that the guide means and the belts move in mutually opposite directions in the area of engagement between the guide means and the slack stretches of the belts.

2. In a round baler as claimed in claim 1,
   said guide means being positioned to continuously engage the belts whereby to maintain contacting engagement therewith even when no slack is present in the belts.

3. In a round baler as claimed in claim 1,
   said belts in the area of engagement between the guide means and the slack stretches being inclined upwardly and forwardly with respect to said certain direction of belt travel.

4. In a round baler as claimed in claim 1,
   said element being generally flat and disposed for edgewise rotation between the belts.

5. In a round baler having at least a pair of side-by-side belts movable in a certain linear direction during baling operations and an interior region inside of the belts tending to collect residue during baling operations, mechanism for removing residue from said region including:
   a rotary element disposed for rotation within a space between said belts for engaging residue within the region and expelling the residue through said space;
   guide means outside of the belts in disposition for engaging slack stretches in the belts in the event such slack stretches form adjacent the element during baling operations and for causing such slack stretches to accumulate on the upstream side of the axis of rotation of the element with respect to said certain direction of belt travel during said movement of the belts,
   said guide means comprising a pair of generally cylindrical hubs fixed to said element and projecting laterally outwardly from opposite sides of the element into underlying relationship with the adjacent belts; and
   means including a drive shaft coupled with said hubs for driving the hubs and the element as a unit about the axis of rotation of the element.

6. In a round baler as claimed in claim 5,
   said drive shaft being rotatable in such a manner that the hubs and the belts move in mutually opposite directions in the area of engagement between the hubs and the slack stretches of the belts.

7. In a round baler as claimed in claim 5,
   said hubs being coupled with the drive shaft in a manner to prevent relative rotation between the shaft and the hubs yet permit the hub and element unit to be adjustably freely shifted along the shaft by engagement of the belts with the element during tracking changes by the belts.

8. In a round baler as claimed in claim 7,
   said shaft having a series of peripheral flats thereon,
   said hubs including a portion having a cross-sectional configuration corresponding to that of the shaft.

9. In a round baler as claimed in claim 5,
   said element being generally flat and disposed for edgewise rotation between the belts.

10. In a round baler having at least a pair of side-by-side belts movable in a certain linear direction during baling operations and an interior region inside of the belts tending to collect residue during baling operations, mechanism for removing residue from said region including:
    a rotary element disposed for rotation within a space between said belts for engaging residue within the region and expelling the residue through said space; and
    guide means outside of the belts in disposition for engaging slack stretches in the belts in the event such slack stretches form adjacent the element during baling operations and for causing such slack stretches to accumulate on the upstream side of the axis of rotation of the element with respect to said certain direction of belt travel during said movement of the belts,
    said mechanism further including a drive shaft extending across the outside of the belts and having an axis of rotation coinciding with the axis of rotation of the element,
    there being a plurality of said elements spaced along the shaft and interposed between respective pairs of the belts,
    said guide means comprising a pair of cylindrical hubs extending laterally outwardly from opposite sides of each element into underlying relationship with an adjacent belt,
    each hub being fixed to its element in coaxial relationship therewith and being drivingly coupled with said shaft.

11. In a round baler as claimed in claim 10,
    said shaft being rotatably driven in such a manner that the hubs and belts move in mutually opposite directions in the area of engagement between the hubs and the slack stretches of the belts.

12. In a round baler as claimed in claim 10,
    said element being generally flat and disposed for edgewise rotation between the belts.

13. In a round baler having an upright sidewall and a belt located adjacent said sidewall and movable in a certain linear direction during baling operations, said belt partially defining an interior region inside of the belt tending to collect residue during baling operations, mechanism for removing residue from said region including:
- a rotary element disposed for rotation within a space between the belt and the sidewall for engaging residue within the region and expelling the residue through said space; and
- guide means outside of the belt in disposition for engaging a slack stretch in the belt in the event such slack stretch forms adjacent the element during baling operations and for causing such slack stretch to accumulate on the upstream side of the axis of rotation of the element with respect to said certain direction of belt travel during said movement of the belt,
- said guide means being rotatable with said element about said axis of rotation,
- said element and said guide means being rotatable in such a manner that the guide means and the belt move in mutually opposite directions in the area of engagement between the guide means and the slack stretch of the belt.

14. In a round baler as claimed in claim 13,
- said element being generally flat and disposed for edgewise rotation between the belt and the sidewall.

15. In a round baler having an upright sidewall and a belt located adjacent said sidewall and movable in a certain linear direction during baling operations, said belt partially defining an interior region inside of the belt tending to collect residue during baling operations, mechanism for removing residue from said region including:
- a rotary element disposed for rotation within a space between the belt and the sidewall for engaging residue within the region and expelling the residue through said space;
- guide means outside of the belt in disposition for engaging a slack stretch in the belt in the event such slack stretch forms adjacent the element during baling operations and for causing such slack stretch to accumulate on the upstream side of the axis of rotation of the element with respect to said certain direction of belt travel during said movement of the belt,
- said guide means comprising a pair of generally cylindrical hubs fixed to said element and projecting laterally outwardly from opposite sides of the element,
- one of said hubs projecting into underlying relationship with the belt and the other of said hubs projecting toward said sidewall; and
- means including a drive shaft coupled with the hubs for driving the hubs and the element as a unit about the axis of rotation of the element.

16. In a round baler as claimed in claim 15,
- said drive shaft being rotatable in such a direction that the one hub and the belt move in mutually opposite directions in the area of engagement between the one hub and the slack stretch of the belt.

17. In a round baler as claimed in claim 15,
- said hubs being coupled with the drive shaft in a manner to prevent relative rotation between the shaft and the hubs yet permit the hub and element unit to be adjustably freely shifted along the shaft by engagement of the belt with the element during tracking changes by the belt.

18. In a round baler as claimed in claim 17, said shaft having a series of peripheral flats thereon,
- said hubs including a portion having a cross-sectional configuration corresponding to that of the shaft.

19. In a round baler as claimed in claim 15,
- said element being generally flat and disposed for edgewise rotation between the belt and the sidewall.

20. In a round baler having a pair of parallel, rotatable guide rolls extending across the width of the baler and a plurality of side-by-side belts leading from one roll toward the other and movable in a certain linear direction during baling operations, said belts defining an interior region inside of the belts tending to collect residue during baling operations, mechanism for removing residue from said region including:
- a plurality of rotary elements disposed for rotation within respective spaces between at least certain of the belts,
- said elements being mounted for rotation about a common axis located outside of the belts in such a position that the elements protrude partially into said region for engaging residue and expelling the same through said spaces between the belts;
- guide means rotatable with the elements about said axis of rotation of the elements in disposition for engaging slack stretches in the belts in the event such stretches form during baling operations and for causing such slack stretches to accumulate on the upstream side of the axis of rotation of the elements with respect to said certain direction of belt travel; and
- means for driving said elements and said guide means in the same direction of rotation as said one guide roll whereby said guide means and the belts move in mutually opposite directions in the area of engagement between the guide means and the slack stretches of the belts.

21. In a round baler as claimed in claim 20,
- said guide means comprising a pair of generally cylindrical hubs fixed to each element and projecting laterally outwardly therefrom into underlying relationship with the proximal belts; and
- means including a drive shaft coupled with the hubs for driving each pair of hubs and their elements as a unit about the axis of rotation of the element.

22. In a round baler as claimed in claim 21,
- said hubs being coupled with the drive shaft in a manner to prevent relative rotation between the shaft and the hubs yet permit the hub and element unit to be adjustably freely shifted along the shaft by engagement of the belt with the element during tracking changes by the belt.

23. In a round baler as claimed in claim 22,
- said shaft having a series of peripheral flats thereon,
- said hubs including a portion having a cross-sectional configuration corresponding to that of the shaft.

24. In a round baler as claimed in claim 20,
- said guide means being positioned to continuously engage the belts whereby to maintain contacting engagement therewith even when no slack is present in the belts.

25. In a round baler as claimed in claim 20,
- said belts in the area of engagement between the guide means and the slack stretches being inclined upwardly and forwardly with respect to said certain direction of belt travel.

26. In a round baler as claimed in claim 20, said elements being generally flat and disposed for edgewise rotation between the belts.

27. In a round baler having at least a pair of side-by-side belts movable in a certain linear direction during baling operations and an interior region inside of the belts tending to collect residue during baling operations, mechanism for removing residue from said region including:
- a rotary element having a portion projecting into a space between said belts for engaging residue within the region and expelling the residue through said space,
- said element being adapted for rotation about an axis located outside of the belts; and
- means for driving said element about said axis in such a manner that the portion of the element projecting into said region moves in a direction generally opposite to said certain direction of movement of the belts.

28. In a round baler as claimed in claim 27; and
- guide means outside of the belts in disposition for engaging slack stretches in the belts in the event such slack stretches form adjacent the element during baling operations and for causing such slack stretches to accumulate on the upstream side of the axis of rotation of the element with respect to said certain direction of belt travel during said movement of the belts.

29. In a round baler as claimed in claim 28,
- said guide means having an axis coinciding with said axis of rotation of the element.

30. In a round baler as claimed in claim 29,
- said guide means being rotatable with the element about said axis of rotation of the element.

31. In a round baler as claimed in claim 30,
- said guide means comprising a pair of generally cylindrical hubs fixed to said element and projecting laterally outwardly from opposite sides of the element into underlying relationship with the adjacent belts; and
- means including a drive shaft coupled with the hubs for driving the hubs and the element as a unit about the axis of rotation of the element.

32. In a round baler as claimed in claim 31,
- said drive shaft being rotatable in such a manner that the hubs and the belts move in mutually opposite directions in the area of engagement between the hubs and the slack stretches of the belts.

33. In a round baler as claimed in claim 27,
- said element being generally flat and having said portion disposed to project edgewise between the belts.

* * * * *